(12) United States Patent
Christie et al.

(10) Patent No.: US 7,454,285 B2
(45) Date of Patent: Nov. 18, 2008

(54) OPTIMIZED FLEX FUEL POWERTRAIN

(75) Inventors: Mark Christie, Northville, MI (US); John Stokes, West Sussex (GB)

(73) Assignee: Ricardo, Inc., Van Buren Township, MI (US)

( * ) Notice: Subject to any disclaimer, the term of this patent is extended or adjusted under 35 U.S.C. 154(b) by 0 days.

(21) Appl. No.: 11/865,000

(22) Filed: Sep. 30, 2007

(65) Prior Publication Data

US 2008/0228372 A1 Sep. 18, 2008

Related U.S. Application Data

(60) Provisional application No. 60/894,603, filed on Mar. 13, 2007.

(51) Int. Cl.
*F02M 25/00* (2006.01)
(52) U.S. Cl. .................................. 701/105; 123/1 A

(58) Field of Classification Search ......... 701/103–105; 123/1 A, 25 C, 25 E
See application file for complete search history.

(56) References Cited

U.S. PATENT DOCUMENTS 7,287,509 B1 * 10/2007 Brehob ....................... 123/299

\* cited by examiner

*Primary Examiner*—Hieu T Vo
(74) *Attorney, Agent, or Firm*—Butzel Long

(57) ABSTRACT

A fuel system and powertrain for a flexible fuel system vehicle utilizes a controller system to control variables in an engine and the final drive optimize operating efficiency of the vehicle while using an alcohol-gasoline blend. The controller system regulates engine operating variables such as fuel pressure, fuel flow, air-fuel flow, air-fuel temperature, and valve timing. The controller system regulates engine operating variables such as transmission gear selection and gear changing as well as differential ratio changes.

20 Claims, 5 Drawing Sheets

OPTIMIZED FLEX FUEL POWERTRAIN

TECHNICAL FIELD

The present invention relates generally to powertrains for motor vehicles. More particularly, the present invention relates to an optimized performance flexible fuel system and powertrain for a motor vehicle.

BACKGROUND OF THE INVENTION

The internal combustion engine powered by fossil fuel (gasoline or diesel) is the dominant form of propulsion for motor vehicles, this despite the fact that significant efforts have been made to develop both an alternative fuel source and engines which will run on these fuels for an extended period of time. Alternative power sources have a long history of development. Many factors have motivated this development. One of the earliest reasons for developing alternative fuels and engine systems has been based on efforts to remove reliance on traditional fuel sources. More recently attention has been focused on the reduction of greenhouse gases which are known to contribute to global warming. These driving forces have increased the pace of the development efforts and research studies related to alternative fuel systems.

Some examples of alternative fuels include natural gas, hydrogen and bio-fuels such as ethanol. As a fuel ethanol has proven very attractive. Today ethanol blend fuels and he engines capable of running on ethanol blends range from E0 (today's typical gasoline having no ethanol content) to E85 (having 85% ethanol content with 15% gasoline content). Ethanol can be produced readily from certain grain crops, particularly corn. The use of ethanol also reduces the production of greenhouse gases since it is a renewable source of fuel with a $CO_2$ neutral cycle. Ethanol has a high potential to become economically more beneficial over today's widely available fuels.

As a fuel, ethanol has long shown a significant potential as a substitute for conventional gasoline. Today's fuel standards (e.g., ASTM D4814) allow up to 10% ethanol content for regular gasoline and also in the use of E85. Accordingly, flexible fuel vehicles (FFV), which can run on fuels up to E85 ethanol content, are already in several markets around the world. However, because of the lack of fuel infrastructure and the consequential failure of fuel availability, flexible fuel vehicles failed to take advantage of fuel flexibility. One of the obstacles to wider acceptance by the end user has been the reduction in usable vehicle range (reduced heating value) and the lack of tax reductions on the price of bio-fuels at the fuel service center. For example, while flexible fuel vehicles experience no loss of performance when operating on E85, a gallon of ethanol contains less energy than a gallon of gasoline, resulting in the flexible fuel vehicle typically getting about 20-30% fewer miles per gallon when fueled with bio-fuels such as E85. Part of this inefficiency is due to the lack of base engine optimization that is seen in current flexible fuel vehicles. Particularly, no advantage has been taken of beneficial bio-fuel fluid properties such as increased octane numbers.

Some of the high ethanol content fuel usage penalties can be eliminated or reduced by developing dedicated control algorithms and hardware to take advantage of certain thermodynamic properties of ethanol. With the recent market introductions of more sophisticated subsystems, for example, direct fuel injection, variable valve timing and turbo-charging, the complexity of engine control systems has significantly increased. So-called downsized systems can provide high power density under full load and maintain very good part load fuel economy due to lower friction and reduced losses because of their smaller displacement. Today's systems are capable of accurately controlling such modern gasoline engines. It is believed that these advancements can also be used to further boost performance of flexible fuel vehicle systems by the development of intelligent control algorithms along with modifications to engine hardware.

Accordingly, as with so man areas of technology, there is room for improvement in the use of bio-fuels in flexible fuel vehicles.

SUMMARY OF THE INVENTION

Accordingly, it is the general object of the disclosed invention to optimize a vehicle fuel system and powertrain, particularly a turbo-charged direct injected gasoline engine powertrain system for operating on any blend of ethanol and gasoline from zero to eighty-five percent ethanol with minimized fuel economy penalty to the customer, effectively significantly reducing the vehicle range penalty associated with ethanol blends.

More particularly, the disclosed invention provides a powertrain for a motor vehicle which takes advantage of the improved wide open throttle performance of bio-fuels. This improved performance allows the transmission driveline to be re-optimized to different operating points, thereby making the engine operate at a point of high brake efficiency, thus mitigating some or all of the fuel consumption penalty that the user would experience in traditional flexible fuel vehicles. Based on the revised torque capability of the engine (because it is now running on a bio-fuel blend rather than on gasoline), a revised shift schedule and/or final drive ratio may be used to further improve the operating match. Another embodiment of this invention would be a transmission that runs a different sequence of gears depending on the level of torque being generated by the engine. By running a different combination of gears a different powertrain match is achieved.

Other features of the present invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
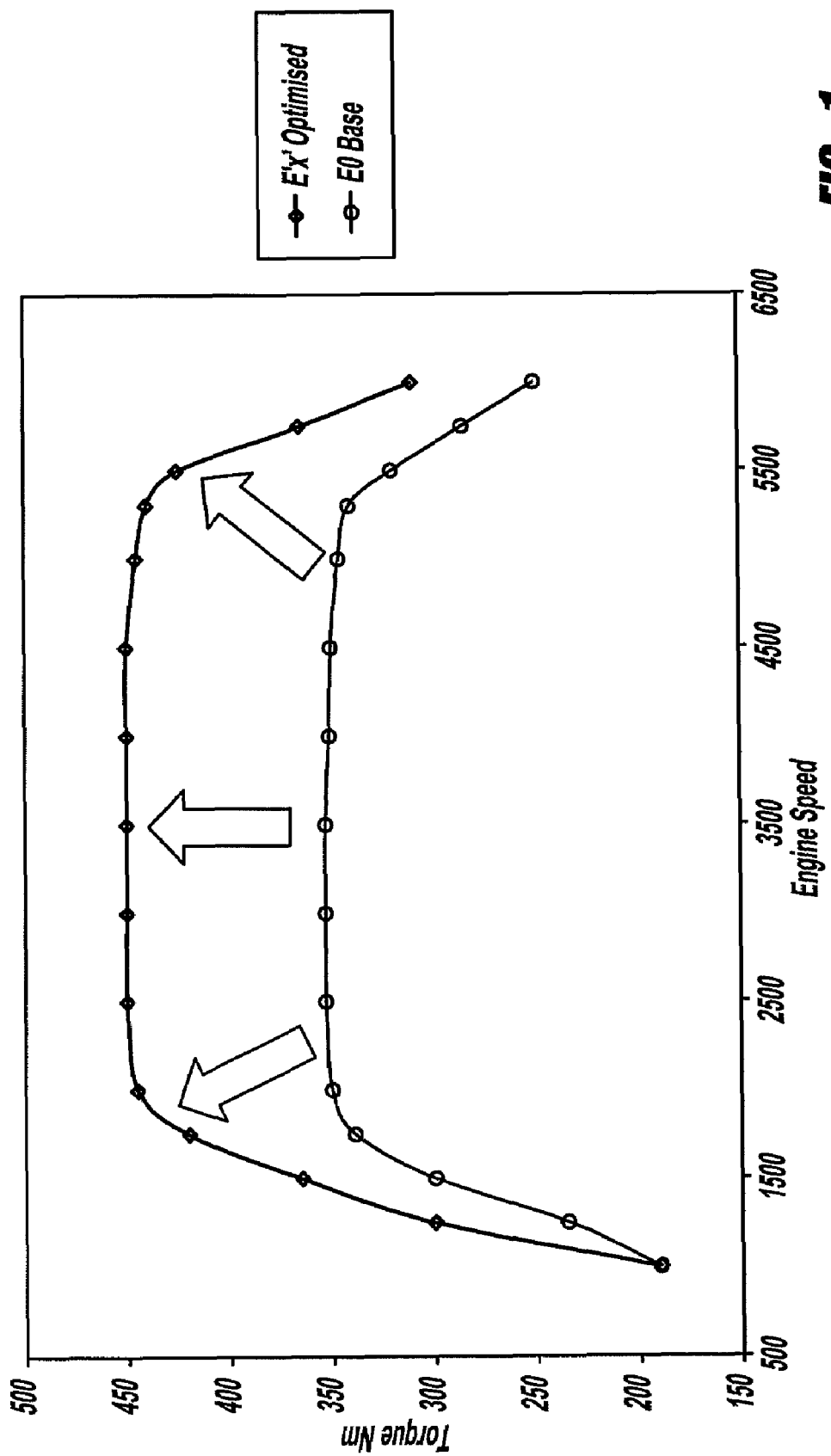
FIG. 1 is a line graph showing the improvement in the torque curve when a turbocharged direct injection engine is run on a high octane bio-fuel such as E85.

In the following figures the same reference numerals will be used to refer to the same components where applicable. In the following description, various operating parameters and components are described for one constructed embodiment. These specific parameters and components are included as examples and are not intended as being limiting.

Referring to FIG. 1, the advantage that can be gained through the use of bio-fuel versus conventional gasoline is graphically illustrated. Engine speed (in rpm) is shown along the x-axis and torque (in Nm) is shown along the y-axis. The upper torque curve, the upsized curve, illustrates an optimized ethanol formulation (E'x') while the lower torque curve, the downsized curve, illustrates conventional gasoline (E0). It is clear by reference to the two torque curves that an optimized bio-fuel (in this example, E85) produces greater torque per rpm than does the conventional fuel formula.

Furthermore, alcohol fuels, such as E85, typically have much higher-octane value than conventional gasoline, thus dramatically reducing engine knock. This advantage can either be taken in the form of improved combustion phasing (with the spark timing running closer to or at optimum spark timing) in regions where gasoline engines are traditionally knock-limited (retarded from spark timing), or, in the case of a boosted engine, higher levels of boost can be tolerated in combination with improved combustion phasing. Both scenarios improve the wide open throttle (WOT) torque levels of the base engine assuming that the engine is at the same or slightly higher compression ratio that would be chosen for gasoline operation. While improved WOT performance has been previously demonstrated, it does not address the part load fuel consumption penalty that exists due to the lower heating value of bio-fuels. Unless there is a change in displacement or in the number of cylinders operating or in compression ratio, this issue is difficult to address.

Figure 2:
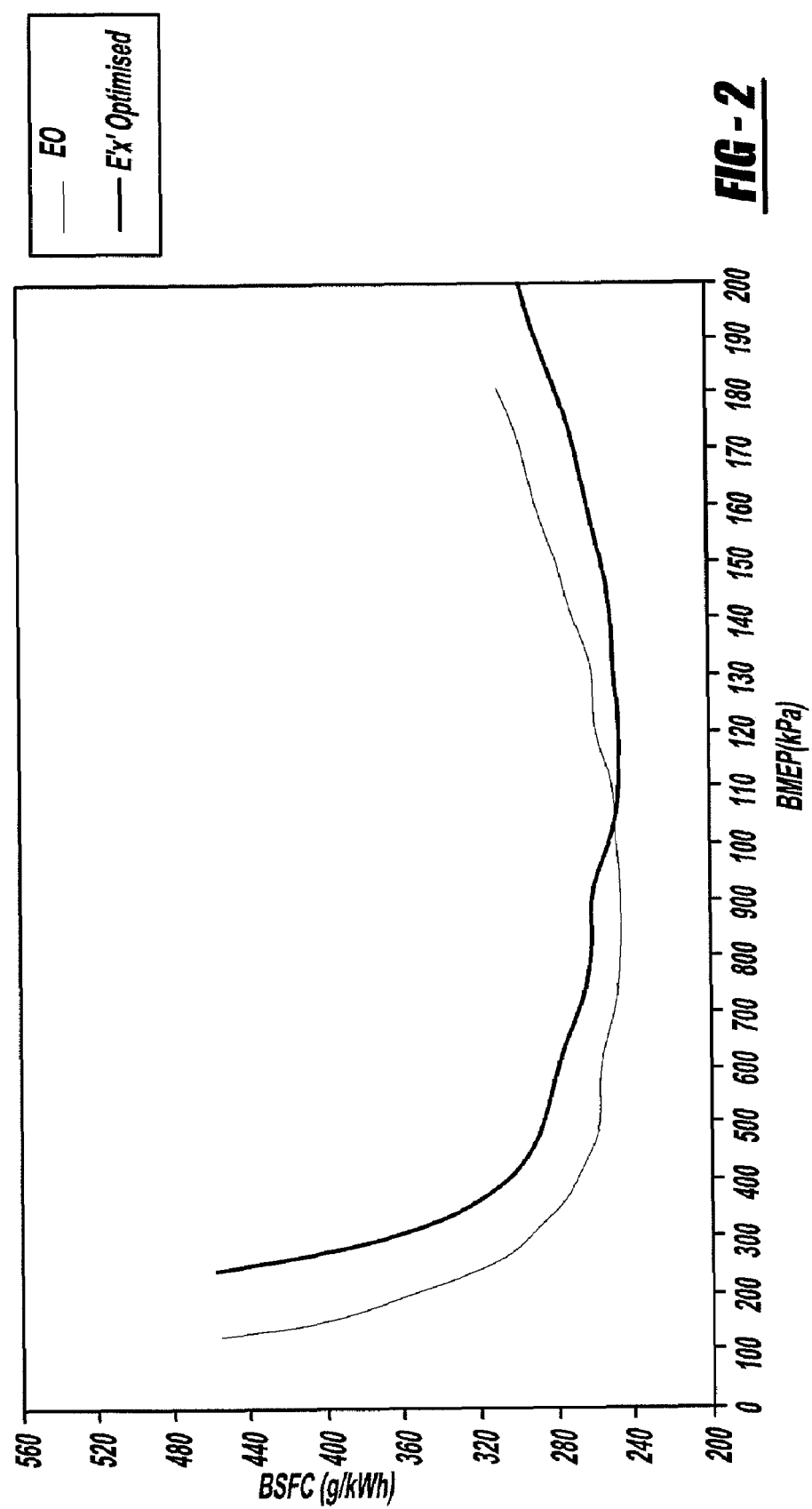
FIG. 2 is a line graph showing a typical BSFC curve comparing an engine running on E0 and bio-fuel.

A better understanding of how fuel consumption by a conventional vehicle using E0 and one using an ethanol-gasoline blend differs may be gained by reference to FIG. 2. In this figure, a line graph showing a typical BSFC (brake specific fuel consumption) curve of an engine running at a fixed speed (for example, 2000 rpm) is set provided. The brake mean effective pressure (BMEP in kPa) is shown on the x-axis while the BSFC (in g/kWh) is shown on the Y-axis. FIG. 2 is a line graph showing a typical BSFC curve comparing an engine running on E0 and bio-fuel. Accordingly, and with this graph in mind, if the objective is to obtain the same fuel consumption between the two fuel types, it is necessary to move the load on the engine at a given speed horizontally along the x-axis. As shown, as speed increases efficiency improves.

Figure 3:
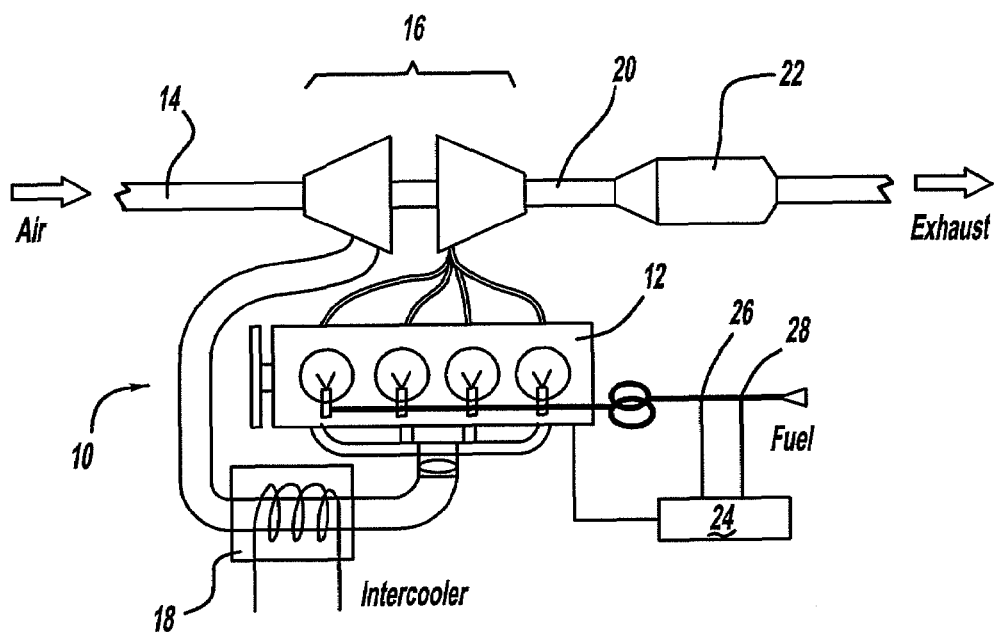
FIG. 3 is a perspective view of a typical direct injection turbo spark-ignited engine layout.

The disclosed invention overcomes the problems described above by first employing a gasoline-optimized, high-technology engine, such as that shown in FIG. 3. With reference thereto, an engine, generally illustrated as 10, is shown. In general the engine 10 allows the exploitation of bio-fuel properties through enhanced performance output and through the application of flex fuel specific components for ethanol fuel handling and improved durability.

The engine 10 includes a cylinder and cylinder block assembly 12, an air input 14 which leads to a booster assembly 16, a temperature reducing intercooler 18, and an exhaust system 20 which includes a catalytic converter 22. The booster assembly 16 is preferably either a turbocharger or a supercharger. If a turbocharger, the assembly 16 is preferably, but not absolutely, of the variable geometry turbocharger (VGT) type. An engine control system 24 is provided. A fuel alcohol sensor 26 is also provided to sense the percentage of alcohol (if any) in the fuel. The engine control system 24 is preferably a closed loop system which adapts the engine control strategy set forth herein through appropriate control software and optimization feedback control algorithms for online optimization of control parameters based on detected ethanol content of the fuel. The feedback control algorithms provide optimum fueling and spark timing.

Figure 4:
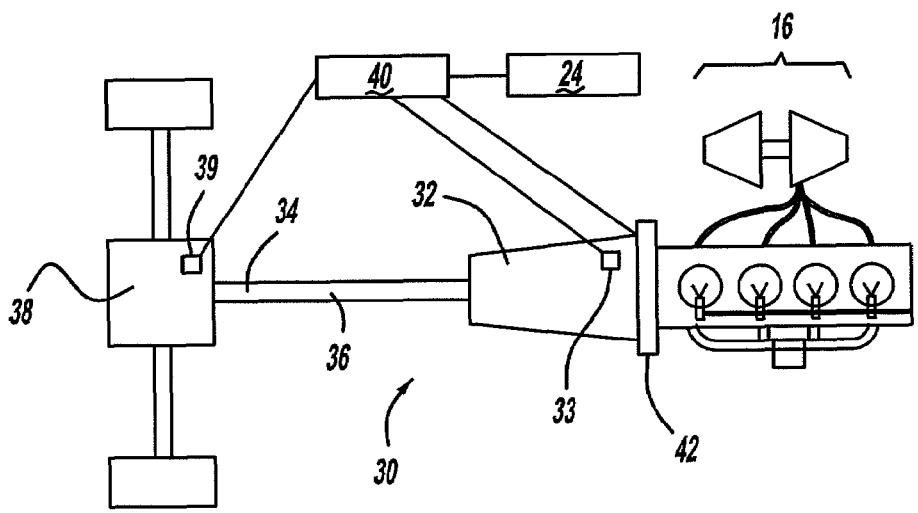
FIG. 4 is a perspective view of a typical driveline layout incorporating the engine of FIG. 3.

The engine 10 and its associated engine control system 24 is used in conjunction with a drive train. This arrangement is set forth in FIG. 4. With reference thereto, the engine 10 and the engine control system 24 are part of a vehicle drive train, generally illustrated as 30. The drive train 30 includes a transmission 32 (manual or automatic) having internal gears and gear changers as is known in the art, a transmission controller 33, and a final drive 34 which includes a drive shaft 36 and a differential assembly 38. The differential assembly 38 has gears capable of being adjusted to achieve specific variable drive ratios as is known the art and a differential controller 39. A drive system controller 40 works in conjunction with the engine control system 24 to optimize gear ratios and gear sequences as will be set forth below. Of course, the drive train 30 is of the rear wheel drive variety, but it is to be understood that the present invention may apply as well to a front wheel drive vehicle with little modification.

Managed by the drive systems controller 40 working with the engine control system 24, the transmission 32 and the differential assembly 38 is continuously re-optimized to different operating points, thereby making the engine operate at a point of high brake efficiency. This system mitigates some or all of the fuel consumption penalty that the user would normally experience driving a traditional flexible fuel vehicle. Based on the revised torque capability of the engine (because it is now running on bio-fuel rather than on conventionally blended gasoline) a revised shift schedule and/or a modified final drive ratio would be used to further improve the operating match. It is also possible that the transmission 32 would run a different sequence of gears as directed by the drive systems controller via the transmission controller 33 depending on the level of torque the engine is generating. By running with a different combination of gears a different powertrain match is achieved. Thus the engine control system 24 working with the drive systems controller 40 allows for the use of any ethanol-based fuel mixture (up to 85% ethanol) and does not compromise the engine performance under gasoline operation. The disclosed invention provides a drive line for a true flexible fuel vehicle having little or no vehicle range penalty when compared with a vehicle operating with E0.

Figure 5:
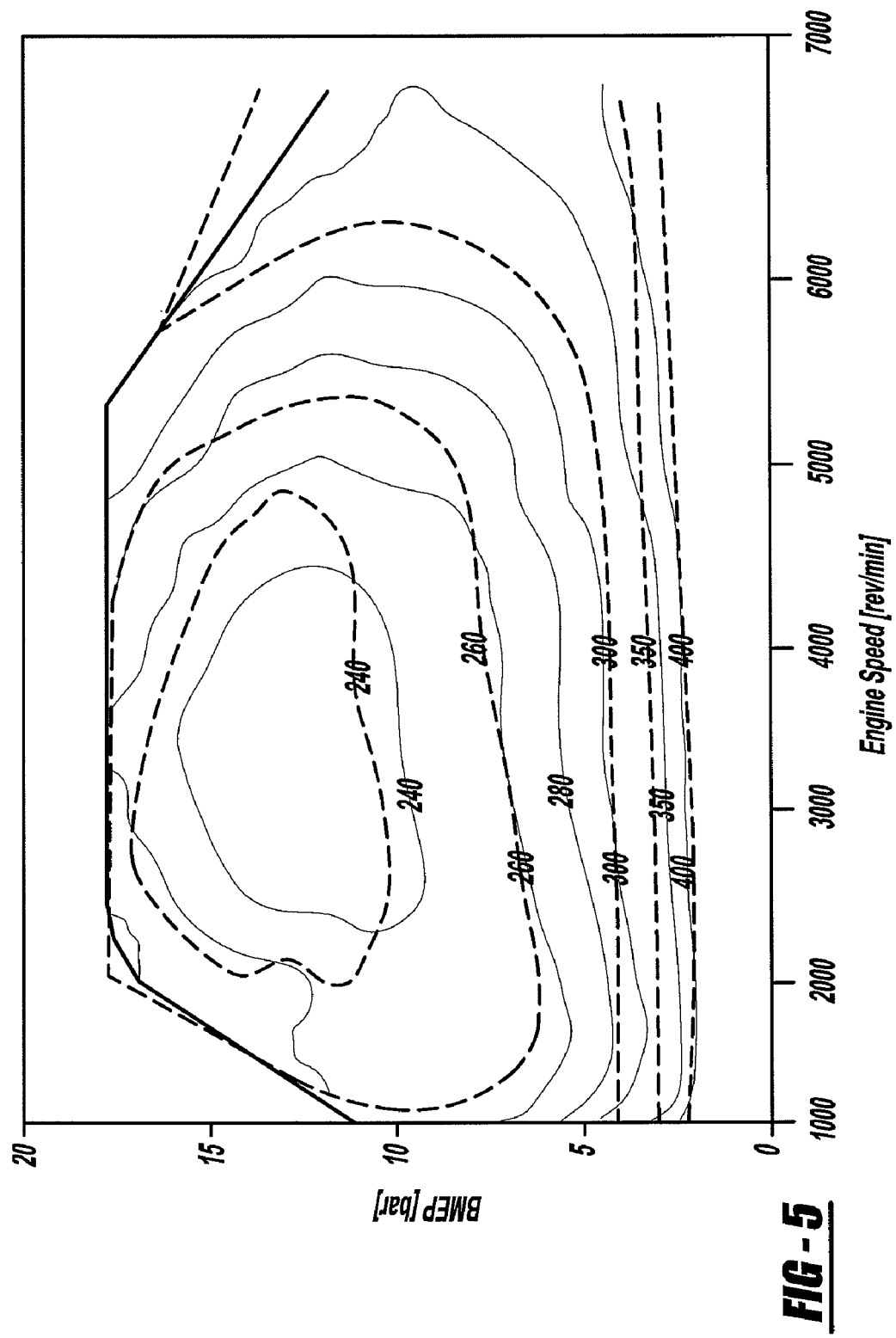
FIG. 5 is a graph showing a typical transmission match.
Figure 6:
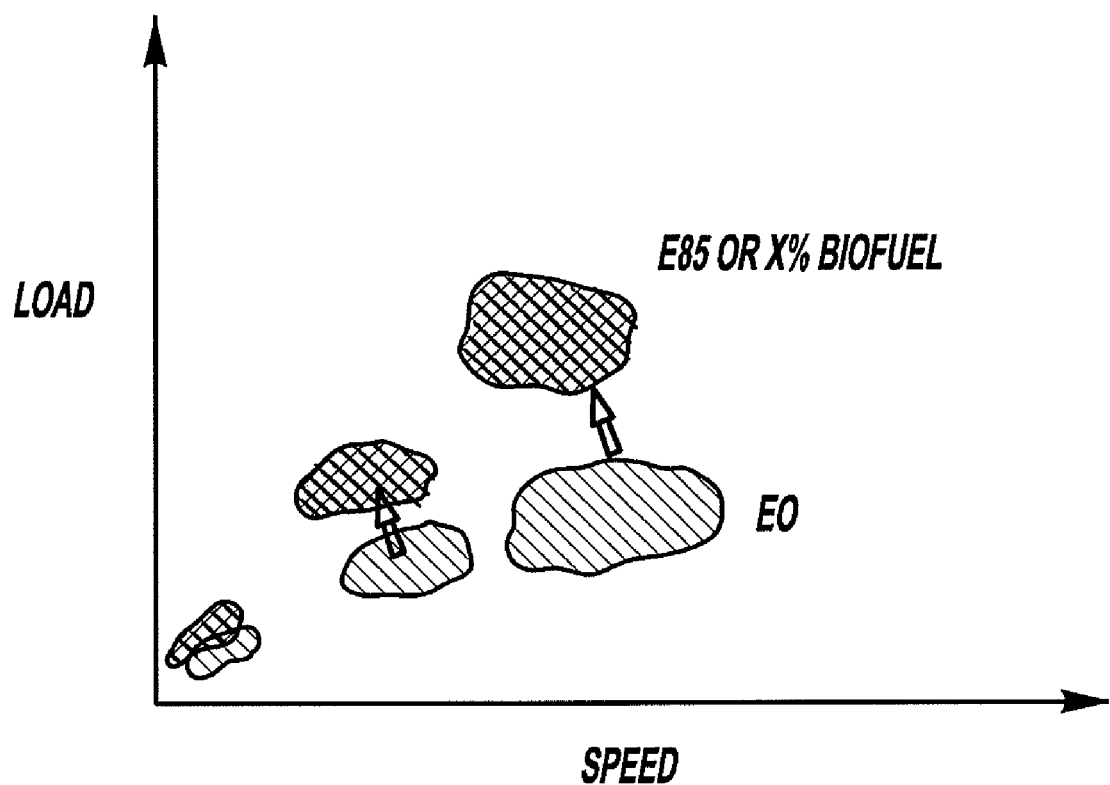
FIG. 6 shows high energy usage points on a drive cycle with typical operating points for a conventional drive train match shown by E0 and the impact of revised operating points when the drive train match is changed for E85 or bio-fuel.

The optimization of the powertrain matching through intelligent transmission and driveline matching to achieve superior fuel efficiency and performance with the detected ethanol fuel is shown in FIGS. 5 and 6. With respect first to FIG. 5 a graph showing optimized gear ratios is illustrated. With reference thereto, engine speed (in rpm) is shown along the x-axis and the BMEP (in bars) is shown along the y-axis. This graph illustrates a mixture of torque curves with efficiency contours and provides information on ideal gear matches for the transmission 32.

FIG. 6 illustrates different engine operating efficiencies based on load and engine speeds. With reference thereto, engine speed (in rpm) is shown along the x-axis while load is shown on the y-axis. This graph illustrates the desired operating point as needed to improve efficiency when E85 or another bio-fuel is used.

Accordingly, the engine control system 24 is provided with software having an algorithm which is based on known data of the variables influencing engine efficiency according to a broad variety of engine operating features. In operation, the engine control system 24 operates to maximize the efficiency of the engine 10 through modifications to fuel flow, fuel pressure and spark timing based on the percentage of alcohol determined to be in the fuel by the sensor 26. Working in conjunction with the drive system controller 40 additional modifications are made, also based on appropriate software with the appropriate algorithm based on known data of the variables influencing drive train efficiency, to the final drive 34. Particularly, and as noted above, the gears of the transmission 32 could be changed based on pre-established calibration points based on the operation of the transmission controller 33 acting on instructions from the drive system controller 40. (A similar modification could be made to an automatic transmission whereby a change in the transmission's shift schedule could be adopted.) The gear changes of the transmission 32 could be made at different speeds at the low point as a function of the sensed alcohol blend. In addition, a different combination of gears could be used that would change the load or the operating point of the engine as a function of consumption of the alcohol blend.

Either as an alternative to modifying either transmission gear changing or transmission gear combination or in conjunction with such modifications, the drive system controller 40, working with the engine control system 24, could direct the differential assembly 38 having a variable final drive ratio to modify the ratio (or make other internal gearing modifications) so as to maximize performance, also according to the pre-loaded software. The drive system controller 40 causes a change in ratios based on signals to the differential controller 39.

As a further variation of the disclosed invention, a variable ratio component 42 could be fitted between the engine 10 and the transmission 32. The variable ratio component 42 would be fitted with a variable ratio, for example, a 2:1 capability, and would be continuously variable. Working in conjunction with the drive system controller 40 the variable ratio component 42 Would change ratios as a function of the alcohol ratio determined initially by the sensor 26.

While the invention has been described in connection with one or more embodiments, it is to be understood that the specific mechanisms and techniques which have been described are merely illustrative of the properties of the invention, numerous modifications may be made to the methods and apparatus described without departing from the spirit and scope of the invention as defined by the appended claims.

What is claimed is:

1. A system for a vehicle having an internal combustion engine which utilizes an alcohol-fuel mixture, the system comprising:
    a fuel system;
    an alcohol content identification system;
    an engine having a direct fuel injection system, said fuel system and said alcohol content identification system being operatively associated with said engine;
    a final drive system, said final drive system having changeable operating parameters; and
    a system controller operatively associated with said fuel system, said alcohol sensor, said engine, and said final drive system.

2. The system of claim 1 wherein said system controller includes system-operating software, said software including a system-controlling algorithm.

3. The system of claim 2 wherein said system controller includes an engine controller and a final drive controller.

4. The system of claim 1 wherein said direct fuel injection system includes a booster taken from the group consisting of a turbocharger and a supercharger, said system controller being operatively associated with said booster.

5. The system of claim 1 wherein said final drive system includes a transmission and a differential.

6. The system of claim 5 wherein said transmission includes gears and a transmission controller and wherein said transmission controller responds to said system controller to change said gears.

7. The system of claim 5 wherein said transmission includes gears and a transmission controller and wherein said transmission controller responds to said system controller to change the combination of gears.

8. The system of claim 5 wherein said differential includes a variable ratio arrangement and a differential controller and wherein said differential controller responds to said system controller to change gear ratios.

9. The system of claim 1 wherein said final drive system includes a transmission and a variable ratio component fitted between said engine and said transmission, said variable ratio component being operatively associated with said system controller.

10. A system for a vehicle having an internal combustion engine which utilizes an alcohol-fuel mixture, the system comprising:
    a fuel system, said fuel system having adjustable fuel flow and fuel pressure;
    an alcohol content identification system;
    an engine having a direct fuel injection system, said fuel system and said alcohol content identification system being operatively associated with said engine, said engine having adjustable spark timing;
    a system controller operatively associated with said fuel system, said alcohol content identification system, and said engine, whereby said fuel flow, said fuel pressure and said spark timing are subject to modification during operation of the vehicle as directed by said system controller.

11. The system for a vehicle of claim 10 further including a final drive system, said final drive system having changeable drive parameters.

12. The system for a vehicle of claim 11 wherein said changeable drive parameters include changeable gear ratios.

13. The system for a vehicle of claim 11 wherein said changeable drive parameters include changeable gear selection.

14. The system for a vehicle of claim 10 including a booster, said booster being selected from the group consisting of a turbocharger and a supercharger.

15. The system for a vehicle of claim 10 wherein said system controller includes system-operating software, said software including a system-controlling algorithm.

16. The system for a vehicle of claim 15 wherein said system controller includes an engine controller and a final drive controller.

17. The system for a vehicle of claim 10 further including a final drive system.

18. The system for a vehicle of claim 17 wherein said final drive includes a transmission, said transmission including gears and a transmission controller and wherein said transmission controller responds to said system controller to change gears.

19. The system for a vehicle of claim 17 wherein said final drive includes a differential, said differential including a variable ratio arrangement, and a differential controller, and wherein said differential controller responds to said system controller to change gear ratios.

20. A method for operating a flexible fuel vehicle having an internal combustion engine which utilizes an alcohol-fuel mixture, the method comprising:

forming an operating system which includes a fuel system having fuel, an alcohol content identification system, an engine having a boosted direct fuel injection system, said fuel system and said alcohol content identification system being operatively associated with said engine, a final drive system, said final drive system having changeable drive parameters, and a system controller operatively associated with said fuel system, said alcohol sensor, said engine, and said final drive system;

determining if alcohol is present in said fuel;

if alcohol is present in said fuel, determining the percentage of alcohol in said fuel; and in response to the percentage of alcohol in said fuel, modifying one or more variables of said operating system including modifying fuel flow, fuel pressure, spark timing, drive train gear changing and drive train gear ratios.

* * * * *